Patented Sept. 4, 1928.

1,683,405

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

PROCESS FOR MAKING VITREOUS POLYMERIZED STYROLS AND PRODUCTS OBTAINED THEREBY.

No Drawing. Original application filed May 7, 1924. Serial No. 711,584. Divided and this application filed January 31, 1925. Serial No. 6,002.

This invention relates to the recovery of styrol-containing fractions from pretoleum oil and the isolation of vitreous polymerized styrol therefrom.

This application is a division of my copending application Serial No. 711,584, filed May 7, 1924.

The terms "vitreous polymerized Ar.CH:CH$_2$" and "vitreous polymerized styrol" as used herein are intended to include that polymerized Ar.CH:CH$_2$ and that polymerized styrol which are tough and transparent and which may be practically colorless. They also show a dull fracture and may be cut with a knife to form thin films or parings. The terms exclude the brittle impure resinous products which show a bright sharply defined fracture, which have a generally brownish color and a lower melting point than the vitreous type, and which when cut with a knife chip or crumble.

The invention accordingly comprises a process for making vitreous polymerized styrol and similar hydrocarbons which comprises recovering styrol and hydrocarbons of the general formula ArCH:CH$_2$ where Ar represents aryl, directly from petroleum oil. More specifically the invention relates to processes of fractionating petroleum oils to yield ArCH:CH$_2$- containing hydrocarbons and recovering vitreous polymerized ArCH:CH$_2$ therefrom.

The invention comprises the steps of fractionating the petroleum oil, subjecting to a polymerizing action the ArCH:CH$_2$-containing fraction, separating out the nonstyroloid hydrocarbons, depolymerizing the resinous ArCH:CH$_2$ to give unpolymerized ArCH:CH$_2$, and repolymerizing the latter to form vitreous polymerized ArCH:CH$_2$.

In my copending application No. 6,003, filed January 31, 1925, it was stated that certain by products of the carbureted water gas industry contain ArCH:CH$_2$-yielding hydrocarbons. It has also been found that another source of Ar.CH:CH$_2$ is obtained by cracking petroleum oils directly. These oils may be cracked under widely varying conditions for the purpose of producing ArCH:CH$_2$-containing fractions.

As an example of such procedure 8000 grams of Oklahoma petroleum are passed through a hot tube at a temperature of 650° C. and at a rate of 20 grams per minute. Simultaneously a stream of some inert gas, such as nitrogen or carbon dioxide is passed through the tube at the rate of say 50–60 ccs. per minute. This cracking operation yields 4400 grams of gas and 3200 grams of liquid condensate. This condensate is found to contain about 500 grams of styrol amounting to 6.25% based on the amount of oil originally cracked. The condensate is distilled with steam and a distilate amounting to 1920 grams is obtained. This is then subjected to a polymerizing action by heat at 200–220° C. for approximately 16 hours to produce the resinous polymerized styrol. This is then distilled to free it from other hydrocarbons and depolymerized by dry distilling at 350–500° C. to form a mixture containing styrol and distyrol together with small amounts of other hydrocarbons. Steam distillation of this mixture frees the styrol from the distyrol and other high boiling substances which may be present. The resultant styrol is then polymerized to the vitreous modification according to processes set forth in the application of Ostromislensky and Gibbons, Serial No. 711,585, filed May 7, 1924 or of my copending application Serial No. 711,584, filed May 7, 1924, of which the present application is a division.

According to the first of these copending applications, a composition containing at least 40% of styrol may be heated at 135–200° C. for approximately 100–8 hrs. In the second of the above applications styrol of approximately 96% purity may be heated for about 20 hrs. at 135–140° C. In both instances the tough polymerized styrol, herein called vitreous polymerized styrol, is obtained free from impure brittle modification herein described as resinous polymerized styrol.

While a specific example of a cracking method has been given for obtaining a styrol containing fraction directly from petroleum oil, it is understood that the invention is not limited to this particular example but will include in its scope other cracking processes by which a styrol containing fraction may be obtained.

An advantage of this process is that the styrol-containing fraction may be separated from the petroleum oil, and at the same time gas may be obtained along with other by-products which have a commercial value.

As many apparently widely different embodiments of this invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process for producing vitreous polymerized styrols from crude petroleum oil which comprises cracking the crude oil vapors at approximately 650° C. and collecting the condensable portion of this fraction, heating the styrols in said fraction to form brittle, impure resinous polymerized styrol, heating the resinous polymerized styrol to form unpolymerized styrol of greater purity, and repolymerizing said unpolymerized styrol to form tough vitreous polymerized styrol.

2. A process for producing vitreous polymerized styrols from crude petroleum oil which comprises cracking the crude oil vapors at approximately 650° C., separating the gas from the condensable liquid portion of said fraction, distilling the condensate and polymerizing it at approximately 200–220° C. to form a brittle, impure resinous polymer, purifying and depolymerizing said resinous polymer, separating the purified styrol therefrom, and subsequently repolymerizing the purified unpolymerized styrol recovered therefrom to form vitreous polymerized styrol.

3. A process for producing vitreous polymerized styrols from crude petroleum which comprises passing the petroleum through a hot tube at approximately 650° C. in the presence of an inert gas, separating the condensable portion of the fraction from the gaseous portion thereof, distilling the condensate thus formed, polymerizing the distillate at approximately 200–220° for 16 hrs. to form brittle, impure resinous polymerized styrol, separating the resinous polymer from other hydrocarbons by distillation, depolymerizing the polymer, recovering purified styrol from the unpolymerized liquid, and heating the styrol thus recovered at 135–200° C. to form tough vitreous polymerized styrol.

4. In a process for making styrols from crude petroleum oils, in which the oils are cracked and a styrol-containing condensate is collected, distilled, the distillate collected and polymerized to form a resinous polymerized styrol, the steps of depolymerizing the resinous polymer into liquid form and subsequently removing therefrom a styrol of greater purity.

5. In a process for producing styrols from crude petroleum, wherein the petroleum is cracked to give a styrol-containing fraction which is heated to form an impure resinous polymerized styrol, the steps of distilling the resinous polymerized styrol to remove some of the hydrocarbon impurities therein, depolymerizing the partially purified resinous polymer and separating from the depolymerized liquid a styrol of increased purity.

Signed at Cromwell, county of Middlesex and State of Connecticut, this 26th day of January, 1925.

IWAN OSTROMISLENSKY.